(12) United States Patent
Debaty

(10) Patent No.: US 8,233,461 B1
(45) Date of Patent: Jul. 31, 2012

(54) COMPLEMENTING NETWORK DISCOVERY WITH PHYSICAL DISCOVERY

(75) Inventor: Philippe Debaty, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1033 days.

(21) Appl. No.: 10/922,631

(22) Filed: Aug. 19, 2004

(51) Int. Cl.
*H04W 4/00* (2009.01)

(52) U.S. Cl. ...................................... 370/338; 370/401

(58) Field of Classification Search .................. 370/328, 370/401, 338, 465, 331; 455/456.1, 424, 455/436; 709/223, 224, 221, 245, 230, 249
See application file for complete search history.

(56) References Cited

U.S. PATENT DOCUMENTS

| | | | |
|---|---|---|---|
| 555,537 A | 9/1996 | Theimer et al. | |
| 5,611,050 A | 3/1997 | Theimer et al. | |
| 571,795 A | 2/1998 | Swinehart | |
| 6,076,106 A | 6/2000 | Hamner et al. | |
| 6,327,535 B1 | 12/2001 | Evans et al. | |
| 6,327,594 B1 | 12/2001 | Van Huben et al. | |
| 6,430,601 B1 | 8/2002 | Eldridge et al. | |
| 6,446,004 B1 | 9/2002 | Cao et al. | |
| 6,480,889 B1 | 11/2002 | Saito et al. | |
| 6,750,883 B1 | 6/2004 | Parupudi et al. | |
| 7,047,423 B1 * | 5/2006 | Maloney et al. | 726/2 |
| 7,130,385 B1 * | 10/2006 | Moon | 379/45 |
| 7,310,666 B2 * | 12/2007 | Benfield et al. | 709/223 |
| 7,316,022 B2 * | 1/2008 | Nishio | 719/321 |
| 7,849,140 B2 * | 12/2010 | Abdel-Aziz et al. | 709/206 |
| 2003/0135624 A1 | 7/2003 | McKinnon et al. | |
| 2003/0158925 A1 | 8/2003 | Uniacke | |
| 2003/0172125 A1 | 9/2003 | Batra et al. | |
| 2003/0217142 A1 | 11/2003 | Bobde et al. | |

OTHER PUBLICATIONS

Drashansky et al ~ "Software architecture of ubiquitous scientific computing environments for mobile platforms" ~ 1996 ~ Kluwer Academic Publishers ~ pp. 421-4132.

Kangas et al ~ "Using Code Mobility to Create Ubiquitous and Active Augmented Reality in Mobile Computing" ~ 1999 ~ ACM ~ pp. 48-58.

Pham et al ~ "A Situated Computing Framework for Mobile and Ubiquitous Multimedia Access using Small Screen Conposite Devices" ~ 2000 ~ ACM ~ pp. 323-331.

Scholtz, Jean ~ "Ubiquitous Computing Goes Mobile" ~ 2001 ~ ACM ~ pp. 32-38.

* cited by examiner

*Primary Examiner* — Chandrahas Patel

(57) ABSTRACT

Methods and systems for complementing network discovery with physical discovery are provided. In one embodiment, a universal physical discovery layer and a legacy network discovery layer are provided. The legacy network discovery layer is implemented using a legacy network discovery protocol. The legacy network discovery layer is separate from and communicates with the universal physical discovery layer. Data representing a physical relationship type between the physical entities is obtained and used to establish the physical relationship type at the universal physical discovery layer.

19 Claims, 4 Drawing Sheets

COMPLEMENTING NETWORK DISCOVERY WITH PHYSICAL DISCOVERY

RELATED APPLICATIONS

This Application is related to U.S. patent application Ser. No. 10/192,487 by Philippe Debaty, Patrick M. Goddi, William Alex Vorbau, Nicolas P. Lyons filed on the Jul. 10, 2002 as the present application and entitled "Web Presence for Physical Entities", assigned to the assignee of the present invention and incorporated herein by reference as background material.

This Application is related to U.S. patent application Ser. No. 10/922,409 by Philippe Debaty, filed on the same date as the present application and entitled "Providing a Development Tool for Building an Application that Provides Portable Computing in a Ubiquitous Computing Environment", assigned to the assignee of the present invention and incorporated herein by reference as background material.

TECHNICAL FIELD

Embodiments of the present invention relate to ubiquitous computing. More specifically, embodiments of the present invention relate to complementing network discovery with physical discovery.

BACKGROUND ART

The fact that technology is moving beyond the personal computer to everyday items is becoming a reality as computing devices are becoming progressively smaller and more powerful. Ubiquitous computing (also known as "pervasive computing") is the result of computer technology advancing at exponential speeds—a trend toward all man-made and some natural products having hardware and software associated with them. Ubiquitous computing goes beyond the realm of personal computers: it is the idea that almost any item, such as clothing, tools, appliances, vehicles, buildings, the human body, eating utensils, can be associated with a device, that logically represents the item. The device can in turn be connected to an infinite network of other devices to create, as much as possible, an environment where the connectivity of the devices is unobtrusive and always available.

In the field of ubiquitous computing, emerging network discovery protocols (also known as "service discovery protocols"), such as Plug and Play (UPnP), Apple Rendezvous™, Jini™ Bluetooth™, Salutation™, SLP™, enable any device on an Internet Protocol (IP) network, associated with a ubiquitous computing environment for example, to discover and control networked consumer electronics devices, such as printers, projectors, television sets, stereo sets, Web cameras, etc. Due to these technologies, a mobile user equipped, for example, with a networked mobile device, such as a laptop computer or a Personal Digital Assistant (PDA) with a wireless network connection, such as 802.11b for example, can discovery all the devices on the network and decide whether to control the discovered devices. For example, the mobile user can use the network discovery protocol to "discover" a printer on the IP network and use it to print a document stored on the mobile user's mobile computer.

However, these network discovery protocols do not provide information about the physical location of the devices, as will be described in more detail. For these and other reasons, a method and/or a system that provides information about the physical location of physical entities would be valuable.

DISCLOSURE OF THE INVENTION

Embodiments of the present invention pertain to methods and systems for complementing network discovery with physical discovery. In one embodiment, a universal physical discovery layer and a legacy network discovery layer are provided. The legacy network discovery layer is implemented using a legacy network discovery protocol. The legacy network discovery layer is separate from and communicates with the universal physical discovery layer. Data representing a physical relationship type between the physical entities is obtained and used to establish the physical relationship type at the universal physical discovery layer.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
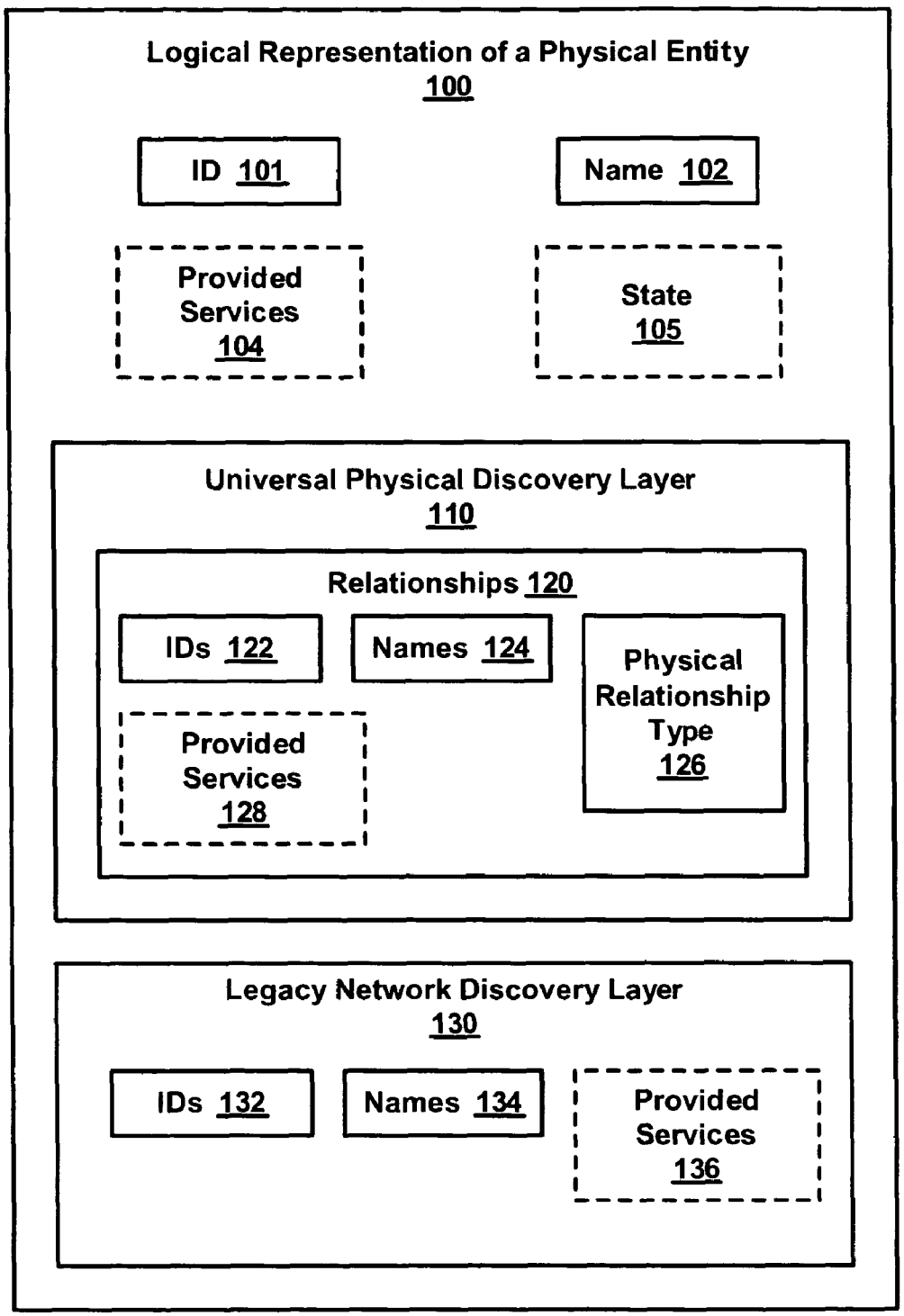
FIG. 1 is a block diagram of a logical representation of a physical entity, according to embodiments of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview of Complementing Network Discovery with Physical Discovery

Any object, such as a printer, is referred to as a physical entity, according to one embodiment. A physical entity is represented in a computer system as a logical representation, according to yet another embodiment, that are implemented on devices, such as printers. Computer systems use legacy types of tools referred to as a network discovery protocol to obtain information about the devices.

However, the network discovery protocols do not provide standardized and contextually relevant information about the physical location of physical entities. For example, a mobile user can "discover" a printer on the network but cannot determine whether the printer is located right in front of the user or at the other end of the building or in another room of the building. According to one embodiment, the universal physical discovery layer complements the information obtained from the one or more network discovery protocols to establish a relationship between physical entities and to provide standardized and contextually relevant information about the physical location of physical entities.

Further, different manufacturers of devices may use different types of legacy network discovery protocols that do not necessarily operate or communicate with each other. For example, one type of network discovery protocol can be used to obtain information about a printer that is bought from manufacturer "A" while another type of network discovery protocol can be used to obtain information about a scanner that is bought from manufacturer "B." According to one embodiment, the universal physical discovery layer communicates with any type of legacy network discovery protocol to establish a relationship between physical entities and to provide standardized and contextually relevant information about the physical location of physical entities.

Physical Entities

A physical entity can be any person, place or thing, according to one embodiment. Although such types of physical entities are specifically stated, the present invention is well suited with various other types of physical entities. Physical entities are represented in computer systems by logical representations, according to one embodiment. Physical entities are devices, such as printers, according to one embodiment. According to another embodiment, physical entities are not devices. For example, the physical entity may be a room. In this case, the logical representation of the physical entity is implemented on a device that is associated with the physical entity, according to an embodiment. Continuing the example, a logical representation of the room may be implemented on an access point associated with the room, as will become more evident.

A Logical Representation of a Physical Entity

FIG. 1 is a block diagram of a logical representation of a physical entity, according to embodiments of the present invention. As depicted in FIG. 1, the logical representation of physical entity (LRofPE) 100 includes an identifier (ID) 101 of the logical representation 100, and a name 102 of the logical representation 100, provided services 104, and a state 105. The optional services 104 is provided by one or more devices the LRofPE 100 is associated with, according to one embodiment. The optional state 105 is maintained for providing one or more of the provided services 128, according to another embodiment. The LRofPE 100 further includes a universal physical discovery layer 110 for establishing relationships 120 between LRofPE 100 and other LRofPEs, as will become more evident, represented by identifiers 122 and/or names 124.

The LRofPE 100 further includes a legacy network discovery layer 130 for discovering devices that implement LRofPEs. The legacy network discovery layer 130 is implemented using any conventional network discovery protocol, such as UPnP, Bluetooth™, SLP™, etc, according to one embodiment. Although such network discovery protocols are recited herein, embodiments of the present invention are also well suited for use with various other types of network discovery protocols. According to one embodiment, the legacy network discovery layer 130 is separate from and communicates with the universal physical discovery layer 110.

According to one embodiment, IDs 132, names 134, and provided services 136 include an ID, name, and provided services for each device discovered by legacy network discovery layer 130. Similarly, IDs 122, names 124, physical relationship types 126, and provided services 128 includes an ID, name, physical relationship type, and provided services for each device for which the legacy network discovery layer 130 provides information to the universal physical discovery layer 110 about, according to one embodiment, as will become more evident.

Identifiers 101, 122, 132 are any identifiers, such as a media access control (MAC) address or a universally uniquely identifier (UUID), that uniquely identify the physical entities represented by logical representations, according to one embodiment. Identifier 101 identifies the logical representation with ID 101. Identifiers 122, 132 identify logical representations implemented on devices that the legacy network discovery layer 130 "discovers," as already described herein.

Names 102, 124, 134, are any human readable names that identify the physical entities represented by logical representations, according to one embodiment. For example, the name 102 for a particular logical representation 100 of a printer is text, such as "printer 2 on floor 3," or "HP printer 2003020," according to one embodiment. The name 102 is initialized by a user or at the manufacturer according to one embodiment. Name 102 identifies the logical representation with ID 101. Names 124, 134 identify logical representations implemented on devices that the legacy network discovery layer 130 "discovers," as already described herein. According to one embodiment, names 102, 124, 134 uniquely identify physical entities represented by logical representations.

Provided services 104, 128, 136, according to one embodiment, are descriptions of the type of services a physical entity provides. For example, if the physical entity is a printer, the provided service may be "printing service," or if the physical entity is a stereo, the provided service may be "playing music service." Other examples of provided services 104, 128, 136, include but are not limited to, "play movie service," "rendering control service," "media transport service," "flight booking service," and "room booking service." Provided services 104 identify the services provided by the devices that implement a logical representation with ID 101. Provided services 128, 136 identify the services provided by devices that the legacy network discovery layer 130 "discovers," as already described herein.

Further, relationships 120 includes physical relationship types 126 that describe the relationships between the physical entity for a particular logical representation with ID 100 and other physical entities with IDs 122. The physical relationship types 126, according to one embodiment, are text that describe the relationship between physical entities, such as a room that "contains" another physical entity, such as a printer or a stereo set. The physical relationship types 126 describe relative physical proximity between physical entities, according to one embodiment, such as "contains," "contained in," "near," etc. The physical relationship types 126 describe relative physical proximity between physical entities, according to one embodiment.

Identifiers 122, names 124, and provided services 128 associated with the universal physical discovery layer 110, according to one embodiment, is a subset of the respective identifiers 132, names 134, and provided services 136 associated with the legacy network discovery layer 130, as will be described in more detail.

Embodiments of the present invention work with more than one network discovery protocol at a time, according to one embodiment. For example, the legacy network discovery layer 130 implements and/or communicates with more than one network discovery protocol, such as UPnP, Bluetooth,™, etc. In another example, the universal physical discovery layer 110 communicates with more than one legacy network discovery layer where each legacy network discovery layer implements a different network discovery protocol.

Ubiquitous Computing Environment

Figure 2:
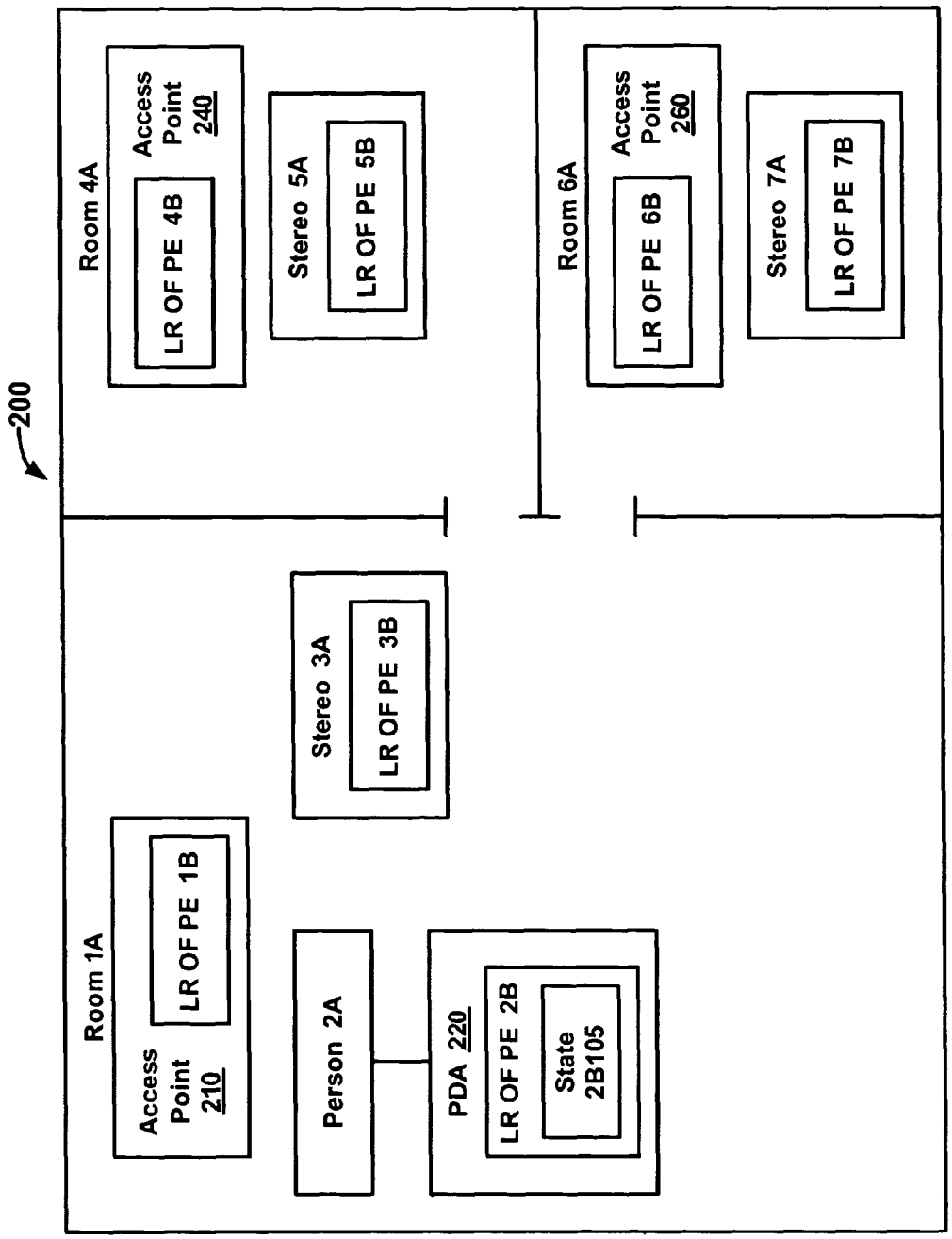
FIG. 2 is a block diagram of a ubiquitous computing environment with physical entities and logical representations of those physical entities for the purpose of establishing relationships between the physical entities, according to embodiments of the present invention.

FIG. 2 is a block diagram of a ubiquitous computing environment with physical entities and logical representations of those physical entities for the purpose of establishing relationships between the physical entities, according to embodiments of the present invention. The blocks in FIG. 2 can be arranged differently than as illustrated, and can implement additional or fewer features than what are described herein.

The ubiquitous computing environment 200 includes physical entities, such as rooms 1A, 4A, 6A, person 2A, a PDA 220, and stereos 3A, 5A, 7A. The ubiquitous computing environment 200 also includes logical representations 1B-7B of the physical entities 1B-7B. For example, LRofPE 1B represents room 1A, LRofPE 2B represents person 2A, and so on.

The LRofPEs 1B-7B may each be implemented on single devices, as depicted in FIG. 2, on a centralized server, or on a hybrid system involving single devices and a centralized server.

In an example of the first case, the LRofPEs 1B-7B is implemented on single devices, such as access points 210, 240, 260 for rooms 1A, 4A, 6A, a PDA 220 or stereos 3A, 5A, 7A, to provide peer-to-peer communication between the devices on which the LRofPEs 1B-7B are implemented, according to one embodiment.

In an example of the second case, the LRofPEs 1B-7B are implemented on a centralized server, according to another embodiment. Further, devices associated with the physical entities 1A-7A, such as access points 210, 240, 270, PDAs 220, and stereos 3A, 5A, 7A, include sensors that communicate with the centralized server, according to yet another embodiment.

In an example of the third case, the software for the universal physical discovery layer 110 and/or the legacy network discovery layer 130 for each of the LRofPEs 1B-7B are implemented on a centralized server, according to yet another embodiment. Further, the devices 210, 220, 240, 260, 3A, 5A, 7A associated with the physical entities 1A-7A include sensors 103, identifiers 101 and/or names 102, among other things, and means of communicating with the universal physical discovery layer 110 and/or the legacy network discovery layer 130 on the centralized server, according to still another embodiment.

The physical entities are devices on which logical representations can be implemented, according to one embodiment, or may not be devices, according to another embodiment. For example, stereos 3A, 5A, 7A are not only physical entities but are also devices that their respective logical representations 3B, 5B, 7B may be implemented on. However, although rooms 1A, 4A, 6A and person 2A are physical entities, they are not devices that their respective logical representations 1B, 4B, 6B, 2B can be implemented on. Therefore, devices, such as access points 210, 240, 260, and PDAs 220, may be used to implement the respective logical representations 1A, 4B, 6B, 2B and associated with the physical entities that the respective logical representations 1A, 4B, 6B, 2B represent.

The network that the devices 210, 220, 240, 260, 3A, 5A, 7A use to communicate with each other are wireless, according to one embodiment or wired, according to another embodiment.

The devices 210, 240, 260, 220, 3A, 5A, 7A associated with the physical entities 1A-7A can use any network discovery protocol to discovery each other, according to one embodiment.

A person, such as person 2A, is an "owner" of a particular LRofPE, such as LRofPE 2B, according to one embodiment. For example, in this case, the device, such as PDA 220, on which the LRofPE 2B is implemented may remain in close proximity to the "owner" of the LRofPE 2B.

State 2B105 associated with LRofPE 2B is used to indicate what provided service 128, such as music, person 2A selected, according to one embodiment. According to another embodiment, the state 2B105 is maintained to indicate any change in providing the provided service 128. For example, state 2B105 may indicate the position the music is playing, at any given point in time.

Relationships

Relationships 120, include, identifiers 122, names 124, physical relationship types 126, and optionally provided services 128, as already described herein. Identifiers 122, names 124, physical relationship types 126, and provided services 128 are referred to herein as "attributes" of relationships 120, according to one embodiment.

According to one embodiment, network discovery provided by legacy network discovery layer 130 is automatic. For example, Bluetooth™, UPnP, etc. can be used to allow all of the devices 210, 240, 260, 220, 3A, 5A, 7A in the ubiquitous computing environment 200 to automatically discover each other. For example, in the case of PDA 220, LRofPE 2B may automatically receive values for the IDs 101 and/or names 102 from the LRofPEs (1B, 3B-7B) for all the other devices (210, 240, 260, 3A, 5A, 7A) associated with the ubiquitous computing environment 200 and store the values in the IDs 132 and names 134 associated with LRofPE 2B.

The legacy network discovery layer 130 provides one or more values from the attributes 132, 134, 136 to the universal physical discovery layer 110, according to one embodiment. Although the legacy network discovery layer 130 provides values for one or more IDs 132, names 134, and provided services 136 to the universal physical discovery layer 110, the legacy network discovery layer 130 does not provide values for the physical relationship types 126. Physical discovery, according to one embodiment, involves initializing the physical relationship types 126. For example, the universal physical discovery layer 110 can initialize the physical relationship types 126, as will be explained in more detail hereinafter. According to another embodiment, physical discovery provided by the universal physical discovery layer 110 ranges from completely manual to completely automatic.

In an example of the automatic physical discovery embodiment, Bluetooth™ has proximity capabilities that allow devices 210, 220, 240, 260, 3A, 5A, 7A associated with a network to determine how close the devices are to each other. The proximity capabilities of Bluetooth™ may be used to automatically determine the physical relationship types 126 between the physical entities 1A-7A. For example, if a person 2A's PDA 220 is closer to stereo 3A than to stereo 5A, universal physical discovery layer 110 can determine that "near" should be stored in the physical relationship type 126 of LRofPE 2B and 3B respectively for the PDA 220 and stereo 3A. Similarly, the proximity capabilities can be used to determine that person 2A is "contained in" room 1A and so on.

Infrared beacons, according to another embodiment and indoor positioning systems, according to yet another embodiment, can also be used for automatic physical discovery.

In an example of the manual physical discovery embodiment, the physical relationship type 126, among other things, is initialized using a manual process, such as a graphical user interface (GUI). A GUI can, for example, display the IDs 132 and/or names 134 associated with the legacy network discovery layers 130 of a particular device, such as LRofPE 2B of PDA 220. The GUI can allow the user to enter one or more physical relationship types 126 for the LRofPEs 1B, 3B-7B represented by the displayed IDs 132 and/or names 134, that the user wants to establish relationships between. More specifically, the user can, for example, enter a physical relationship type "contained in" to indicate that room 1A contains PDA 220, a physical relationship type "near" to indicate that PDA 220 is "near" stereo 3A, and so on. In the event that a physical relationship type is entered, for example with a GUI, for a particular ID 132 and/or name 134, values for that particular ID 132, name 134, and the entered physical relationship type are stored in the IDs 122, names 124, and physical relationship types 126, according to one embodiment.

According to one embodiment, the IDs 122 and/or, names 124 associated with the universal physical discovery layer 110 are a subset of the IDs 132, and/or names 134 associated with the legacy network discovery layer 130. Similarly, provided services 128 may be a subset of provided services 136. This may be accomplished by associating values for physical relationship types 126 with a subset of the IDs 132 and names 134 that are to be stored in IDs 122 and names 124.

Semi-automatic physical discovery is partly automatic and partly manual, according to one embodiment. For example, bar codes can be associated with devices 210, 220, 240, 260, 3A, 5A, 6A. The bar codes can, for example, represent the IDs 101 and/or names 102 of the LRofPEs 1B-7B. In a specific example, a particular bar code can be associated with PDA 220 and a bar code reader can be associated with stereo 5A. If the bar code reader associated with stereo 5A is used to swipe the bar code associated with PDA 220, software such as LRofPE 2B can, for example, receive the IDs 101 and/or names 102 associated with LRofPE 5B and use the IDs 101 and/or names 102 to initialize (e.g., establish) the IDs 132, 122, and/or names 134, 124 associated with LRofPE 5B, as already described herein. The physical relationship type 126 between the PDA 220 and the stereo 5B can be established using a GUI, as already described herein according to one embodiment. In another embodiment, a radio frequency identification (RFID) scanning can be used in semi-automatic physical discovery.

Some network discovery protocols also discover the services that are provided by particular devices. For example, the legacy network discovery layer 130 associated with PDA 220 can discover that stereo 3A provides a "playing music service." The value "playing music service" can be stored in provided services 136 and provided services 128 where the IDs 132, 122 identify stereo 3A.

Values associated with attributes, such as IDs 122, names 124, physical relationship type 126, and provided services 128, are displayed to a user according to one embodiment. Filtering based on the attributes is used to display a subset of the values from the attributes, according to another embodiment. For example, a user may only be interested in seeing values from attributes where the provided services 128 are for playing music. In this case, the user can filter provided services 128 for "playing music" to see the IDs 122, names 124, and physical relationship types 126 associated with the LRofPEs 3B, 5B, 7B for the stereos 3A, 5A, 7A, for example.

In another example, the user may be interested in what printers are on the third floor. For example, person 2A can use their PDA to display information about the printers on the third floor. In response to person 2A requesting this information, the PDA 220 can access the names 124. The names 124 may contain an entry such as "printer 1 on third floor," and another entry such as "printer 2 on third floor," etc. Similarly, the physical relationship types 126 may contain information indicating what printers are on the third floor.

Relationships 120 can be established and also re-established, according to one embodiment, as will become more evident. As defined herein, "established" shall include the initial establishment of a particular relationship but also the re-establishment of that particular relationship.

According to one embodiment, certain types of provided services 104, 128, 136 are accessible from almost any device associated with a ubiquitous computing environment. For example, a flight booking service may be available from any terminal at an airport. In this case, the physical relationship type 126 for a flight bookkeeping service may be established as "universal." Another example of a possibly universally available service is a service that is used for booking conference rooms at a place of work. This room booking service may be available from any computer at the place of work.

Operational Example for Complementing Network Discovery with Physical Discovery

Figure 3:
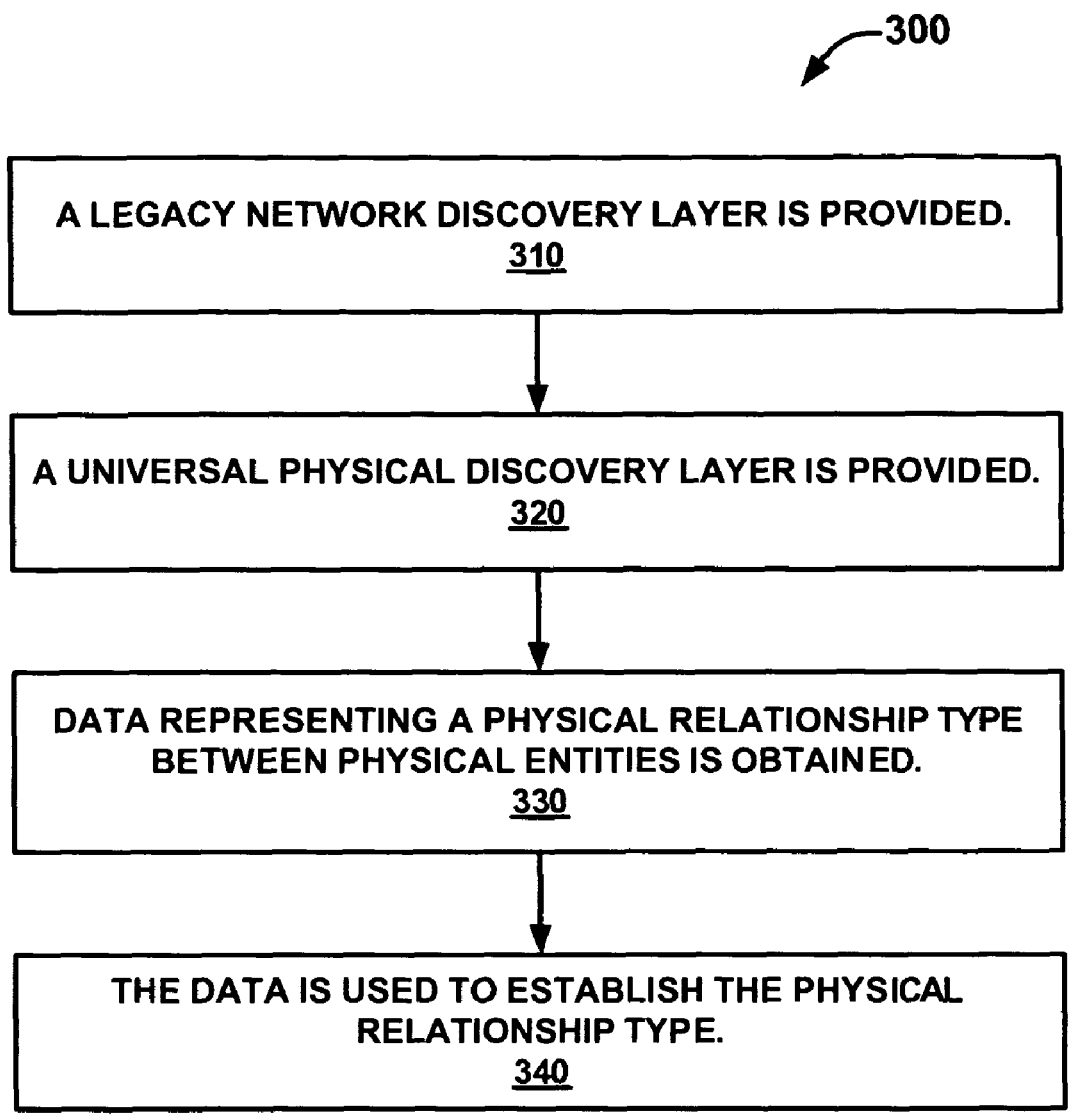
FIG. 3 depicts a flowchart 300 for complementing network discovery with physical discovery, according to embodiments of the present invention.

FIG. 3 depicts a flowchart 300 for complementing network discovery with physical discovery, according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system or like device.

For the purposes of illustration, the discussion of flowchart 300 shall: (1) refer to the structures depicted in FIG. 1 and FIG. 2; (2) assume that each of the LRofPE 1B-7B (FIG. 2) are implemented as a LRofPE 100 (FIG. 1); (3) may refer at times to elements associated with each of the LRofPE 2B-7B (FIG. 2) by concatenating the reference numbers of the individual LRofPE 1B-7B with the reference numbers of the individual elements depicted in FIG. 1. For example, ID 1B101 refers to the ID 101 (FIG. 1) associated with LRofPE 1B (FIG. 2); (4) assume that Bluetooth™ is used to form a network between the devices 210, 220, 260, 3A, 5A, 7A associated with the ubiquitous computing environment 200.

In step 310, a legacy network discovery layer is provided, according to one embodiment. For example, software implementing legacy network discovery layers 130 can be installed on each of the devices 210, 220, 260, 3A, 5A, 7A associated with the ubiquitous computing environment 200 to create legacy network discovery layers 1B130-7B130.

In step 320, a universal physical discovery layer is provided, according to one embodiment. For example, software implementing universal physical discovery layers 110 can be installed on each of the devices 210, 220, 260, 3A, 5A, 7A associated with the ubiquitous computing environment 200 to create universal physical discovery layers 1B110-7B110.

In step 330, data representing a physical relationship type between physical entities is obtained, according to one embodiment. For example, in the case of Bluetooth™, all of the devices 210, 220, 240, 260, 3A, 5A, 7A in the ubiquitous computing environment 200 can discover each other automatically. In other words, the IDs 132 and names 134 associated with the LRofPE 2B implemented on PDA 220 may be used to store the IDs 101 and names 102 from the LRofPEs 1B, 3B-7B for all the other devices 210, 240, 260, 3A, 5A, 7A associated with the ubiquitous computing environment 200, and so on.

Bluetooth™ has proximity capabilities that allows devices 210, 220, 240, 260, 3A, 5A, 7A associated with a network, such as that associated with a ubiquitous computing environment 200, to determine how close the devices are to each other. The proximity capabilities of Bluetooth™ can be used to automatically determine the physical relationship types 126 between the physical entities 1A-7A, according to one embodiment. For example, if person 2A is closer to stereo 3A than stereo 5A, the universal physical discovery layer 110 for LRofPE 3B may determine that the physical relationship type 126 for stereo 3A can be initialized to "near." Similarly, the proximity capabilities can be used to determine that person 2A is "contained in" room 1A.

In step 340, the data is used to establish the physical relationship type. For example, the physical relationship types, such as "contained in," and "near," that were determined in step 330 can be stored in physical relationship types 126 of LRofPE 2B and 3B, etc.

The physical relationship type 126 can be used to provide standardized and contextually relevant information about the physical location of the physical entities 1A-7A in a manner that is unobtrusive and always available, according to one embodiment. For example, the person 2A can use their PDA 220 to indicate they want to play music. Person 2A may not particular care which stereo the music is played on as long as the music is audible to them. The physical relationship types 126 associated with the LRofPE 2B of their PDA 220 can be used to determine that stereo 3A is nearer to person 2A than stereos 5A and 7A. When the desired music begins to play on stereo 3A, the state 2B105 associated with PDA 220 may indicate, among other things, the particular music that person 2A selected and the position at which the music is playing at any given point in time.

At some point in time, person 2A may decide to move out of room 1A and into room 4A. The sensors associated with devices that various LRofPEs (such as the LRofPE 1B, 2B, 4B, 5B) are implemented on can detect that person 2A is carrying their PDA 220 out of room 1A and into room 4A, according to one embodiment. As a result of person 2A moving from room 1A to 4A a different device, such as stereo 5A, may become more appropriate for delivering the service, e.g., playing music, that the user selected. Further, state 2B105 associated with PDA 220 can be used to stop playing the selected music on stereo 3A and start playing the selected music on stereo 5A at whatever position the music had been playing on stereo 3A when person 2A left room 1A.

The universal physical discovery layers 110 of various LRofPEs, such as the LRofPE 1B, 2B, 3B, 4B, and 5B, can, for example, modify their associated physical relationship types 126 to indicate that room 4A "contains" PDA 220 instead of room 1A, and that PDA 220 is "near" stereo 5A instead of stereo 3A, and so on. This modifying of associated physical relationship types 126 is an example of "re-establishing" relationships 120 already referred to herein. Additionally, the proximity capabilities of Bluetooth™ can also be used, for example, to automatically determine the changes in the physical relationship types 126 that result from person 2A moving from room 1A into room 4A.

According to embodiments of the present invention, physical entities, such as PDAs, stereos, printers, etc, can be moved around in a ubiquitous computing environment 200 and the physical relationship types 126 associated with the logical representations of the physical entities may be automatically re-established. For example, when PDA 220 was moved into room 4A, in the above operational example, the physical relationship types 126 of the LRofPE 2B was automatically re-established to indicate that PDA 220 was near stereo 5A instead of stereo 3A and that PDA 220 was contained in room 4A instead of room 1A. Similarly, if another physical entity, such as a stereo or a printer, were moved, the physical relationship types 126 associated with the LRofPEs for a particular ubiquitous computing environment can also be automatically re-established, for example.

Another implementation of embodiments of the present invention can use printers instead of stereos 3A, 5A, 7A. Person 2A may use their PDA 220 to automatically select the nearest printer that is available for printing a document (e.g., connected to the network and not already printing a large document). If person 2A has a busy day, which causes them to move around their work place, and is printing many documents, the documents can be printed on whatever printers person 2A is currently near. For example, if person 2A is near printer 2 during the morning, then person 2A's documents can be automatically printed at printer 2. Then when person 2A moves close to printer 3, person 2A's documents can be printed on printer 3 instead, and so on.

Although the above operational example assumed that Bluetooth™ was used for implementing the legacy network discovery layer 130, UPnP is commonly used in homes. In this case, UPnP can discovery the devices 210, 220, 240, 260, 3A, 5A, 7A associated with a ubiquitous computing environment 200 of a home. In so doing, each of the LRofPEs 1B-7B can, for example, exchange their respective IDs 101, names 102, and possibly even provided services 104 to each other, among other things. The physical relationship types 126 for the respective LRofPEs 1B-7B can, among other things, automatically, semi-automatically, or manually be established, as already described herein.

A Device for Complementing Network Discovery with Physical Discovery

Figure 4:
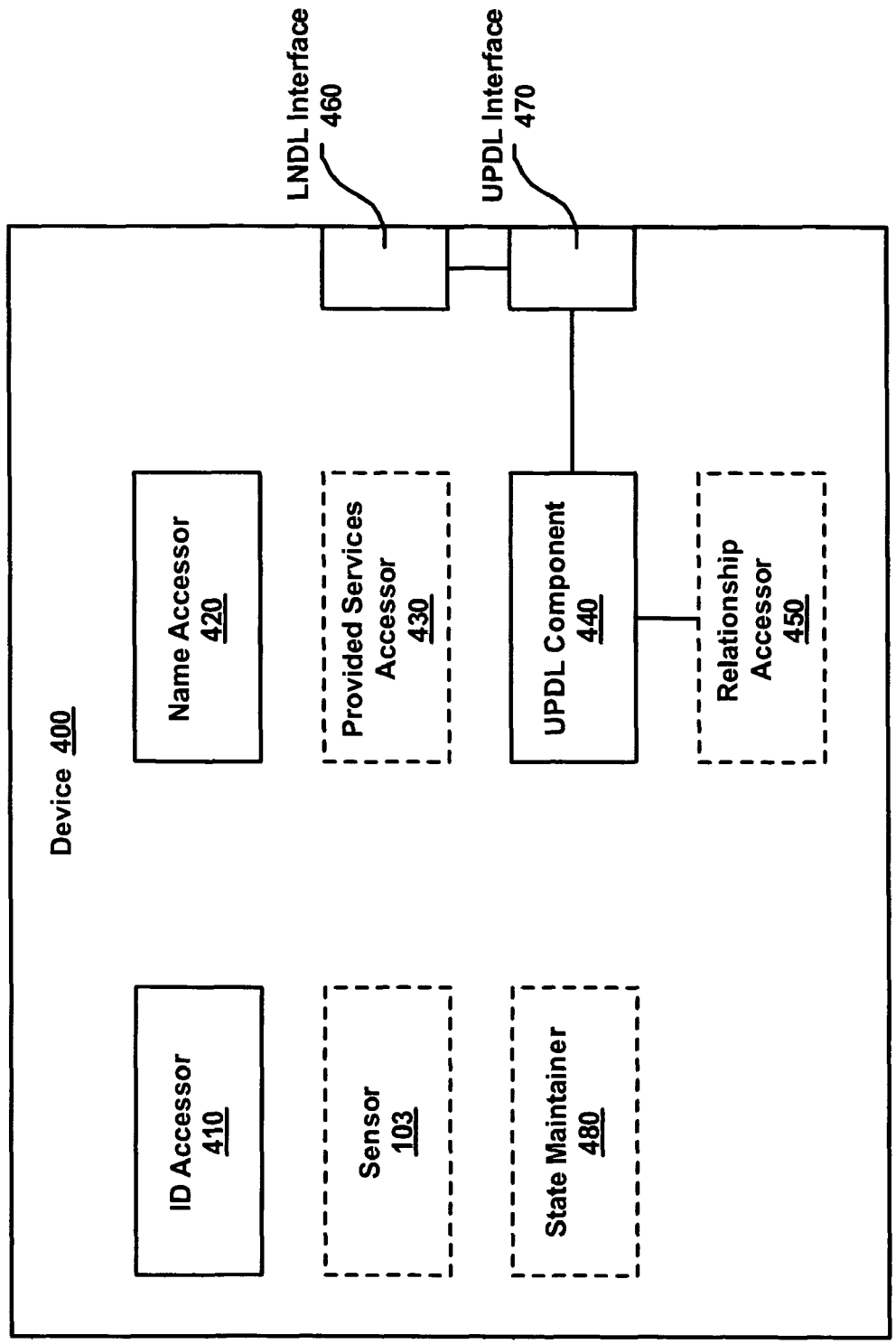
FIG. 4 is a block diagram of a device for complementing network discovery with physical discovery, according to embodiments of the present invention.

As already described herein, the present invention can be implemented using software. According to another embodiment, the present invention can be implemented using a device, such as an Application Specific Integrated Circuit (ASIC), that is installed on another device, such as a printer, stereo, etc. FIG. 4 is a block diagram of a device for complementing network discovery with physical discovery, according to embodiments of the present invention. As depicted in FIG. 4, the device 400 implements, at least a part of a logical representation of a physical entity 100, according to one embodiment. For example, device 400 includes a universal physical discovery layer component 440 for providing a universal physical discovery layer 110 (FIG. 1), a universal physical discovery layer interface 470 for receiving, at least in part, data representing a physical relationship type 126 (FIG.

1) between physical entities, such as physical entities 1A-7A. The universal physical discovery layer component 440 uses the data to establish a physical relationship type 126 using a legacy network discovery layer interface 460 to communicate with a legacy network discovery layer 130 (FIG. 1). The legacy network discovery layer 130 can be implemented using a legacy network discovery protocol. The legacy network discovery layer 130 is separate from the universal physical discovery layer 110 and communicate with the universal physical discovery layer component 440, according to one embodiment.

The device 400 further includes an ID accessor 410 for accessing an ID 101 (FIG. 1), a name accessor 420 for accessing a name 102 (FIG. 1), a provided services accessor 430 for accessing provided services 104 (FIG. 1), and an optional sensor 103. The device 400 further includes a state maintainer 480 for maintaining the state 105 (FIG. 1) of providing a particular service associated with provided services 128 (FIG. 1) to a user.

According to one embodiment, device 400 can be implemented as an ASIC, among other things.

A device 400 is included in another device, such as a PDA, a stereo, a printer, a laptop, etc., according to one embodiment. The legacy network discovery layer 130 that the legacy network discovery layer interface 460 communicates with is installed on a device that includes the device 400, according to one embodiment, or is installed on another device, such as a centralized server, that the device 400 communicates with, according to another embodiment.

The universal physical discovery layer interface 470 receives physical relationship types 126 manually, automatically, or semi-automatically, according to embodiments already described herein.

According to one embodiment, device 400 can be implemented as an Application Specific Integrated Circuit (ASIC), among other things.

According to another embodiment, interfaces 460 and 470 are ports. For example, interfaces 460 and 470 can be ports that USB cables are plugged into.

According to yet another embodiment, UPDL component 440 provides a means for communicating with universal physical discovery layer that is implemented on a device other than device 400, such as a centralized server.

Code Samples for Complementing Network Discovery with Physical Discovery

The following is a sample of code that may be used to establish, remove, and re-establish a relationship between physical entities, according to one embodiment. As depicted in Table 1, a container is used for maintaining relationships. Relationships can be established by adding the relationships to the container, for example, by calling the addContainedEntity method. Relationships can be removed from the container, for example, by invoking the removeContainedEntity method. Relationships can be re-established, for example, by adding the relationship back into the container. Table 1: sample of code for establishing, removing, and re-establishing a relationship between physical entities.

```
public void addContainedEntity(String id) throws RemoteException {
    try {
        if (containedEntities.contains(id)) return;
        logger.debug("adding new contained entity " + id);
        containedEntities.add(id);
```

```
        saveToFile( );
        //notifying the listeners
        eventSource.notifyListeners(
            Spatial EventListener.class,
            "contained EntityDiscovered",
            new SpatialEvent(this.getEntityId( ), id));
        //updating the containerId of the remote entity
        SpatialNode remote = SpatialNodeDiscoverer.lookup(id);
        if (remote != null) {
            //check if the contained entity is already updated with the
correct container
            String containerId = remote.getContainerId( );
            if (containerId == null ||
!containerId.equals(this.getEntityId( )))
                remote.setContainerId(this.getEntityId( ));
        }
    } catch (Exception e) {
        logger.error(e.getMessage( ), e);
        throw new RemoteException(e.getMessage( ));
    }
}
/* (non-Javadoc)
* @see
com.hp.spatial.SpatialNode#removeContainedEntity(java.lang.String)
*/
public void removeContainedEntity(String id) throws RemoteException {
    logger.debug("removing contained entity " + id);
    if (containedEntities.remove(id)) {
        //notifying the listeners
        eventSource.notifyListeners(
            SpatialEventListener.class,
            "containedEntityRemoved",
            new SpatialEvent(this.getEntityId( ), id));
        //removing the containerId from the remote entity
        SpatialNode entity = SpatialNodeDiscoverer.lookup(id);
        if (entity != null && getEntityId( ).equals(entity.getContainerId( )))
            entity.setContainerId(null);
        //updating the file
        try {
            saveToFile( );
        } catch (Exception e) {
            logger.error(e.getMessage( ), e);
        }
    }
}
```

Alternatives and Extensions for Complementing Network Discovery with Physical Discovery Although the examples described herein described person 2A carrying one device, e.g., PDA 220, a person can in fact carry multiple devices, such as a camera, a laptop, a PDA, etc, according to one embodiment. According to another embodiment, a person is the "owner" of one of the devices, such as the PDA 220. In this case, the state 105 associated with that PDA 220 can be used to maintain the state of whatever service the person has currently requested.

Databases can be used for storing and maintaining values for various elements depicted in FIGS. 1, 2, and 4, according to another embodiment. For example, relationships 120, IDs 132, names 134, provided services 136, among other things, can be stored and maintained in a database.

Conclusion to Complementing Network Discovery with Physical Discovery

By providing separate layers for the universal physical discovery layer and the legacy network discovery layer, existing legacy network discovery protocols are used for implementing the legacy network discovery layer, according to one embodiment. Further, the universal physical discovery layer can communicate with more than one legacy network discovery protocol, according to another embodiment.

By providing physical relationship types that describe relative physical proximities between physical entities, standardized and contextually relevant information about the physical location of physical entities are provided, according to yet another embodiment.

What is claimed is:

1. A device-implemented method of complementing network discovery with physical discovery, said method comprising:
using a device to perform:
providing a universal physical discovery layer;
providing a legacy network discovery layer that is implemented using a legacy network discovery protocol, wherein said legacy network discovery layer is separate from and communicates with said universal physical discovery layer;
obtaining data representing a physical relationship type between physical entities in a network;
using said data to establish by said device said physical relationship type at said universal physical discovery layer using said legacy network discovery layer, wherein said physical relationship type describes a relative physical proximity between said physical entities; and
providing said physical relationship type for use at a physical entity of said physical entities wherein said device includes:
a universal physical discovery layer component for providing a universal physical discovery layer;
a universal physical discovery layer interface for obtaining, at least in part, data representing a physical relationship type between physical entities in a network; and
said universal physical discovery layer component using said data to establish by said device said physical relationship type using a legacy network discovery layer interface to communicate with a legacy network discovery layer.

2. The method as recited in claim 1, wherein said legacy network discovery protocol is a service discovery protocol.

3. The method as recited in claim 1, wherein said obtaining data representing a physical relationship type between physical entities in a network comprises:
obtaining said data representing said physical relationships between wired and wireless physical entities communicatively coupled with said network.

4. The method as recited in claim 1, wherein said physical relationship type is selected from the group consisting of contains, contained in, near, nearest, far, and farthest.

5. The method as recited in claim 1 wherein said legacy network discovery layer provides values from one or more attributes to said universal physical discovery layer.

6. The method as recited in claim 5, wherein said attributes consist of identifiers of said physical entities, names of said physical entities, and services provided by said physical entities.

7. The method as recited in claim 5, wherein a subset of values from said attributes is provided to a user by filtering said attributes.

8. A device comprising:
a universal physical discovery layer component for providing a universal physical discovery layer;
a universal physical discovery layer interface for obtaining, at least in part, data representing a physical relationship type between physical entities in a network; and
said universal physical discovery layer component using said data to establish by said device said physical relationship type using a legacy network discovery layer interface to communicate with a legacy network discovery layer, wherein said legacy network discovery layer is implemented using a legacy network discovery protocol and said legacy network discovery layer is separate from said universal physical discovery layer and communicates with said universal physical discovery layer component, and wherein said physical relationship type describes a relative physical proximity between said physical entities and is provided for use at an entity of said physical entities.

9. The device of claim 8, wherein a particular physical entity is selected from the group of a person, a place, and a thing.

10. The device of claim 9, wherein a particular physical entity is a printer.

11. The device of claim 8, wherein a logical representation of a particular physical entity is implemented by a device selected from the group consisting of a centralized server and said particular physical entity.

12. The device of claim 11, wherein said device communicates with other devices by said network, and wherein said network is selected from the group consisting of a peer-to-peer network, a centralized server network, and a hybrid network.

13. The device of claim 8, wherein said universal physical discovery layer interface receives said physical relationship type by one of manually, automatically, and semi-automatically.

14. The device of claim 8, wherein said device further includes a state maintainer for maintaining a state while providing a particular service.

15. A non-transitory computer-usable medium having computer-readable program code embodied therein for causing a computer system to perform a method of complementing network discovery with physical discovery, said method comprising:
providing a universal physical discovery layer configurer;
obtaining data representing a physical relationship type between physical entities in a network;
using said data to establish by said device said physical relationship type at said universal physical discovery layer using a legacy network discovery layer that is implemented with a legacy network discovery protocol, wherein said network discovery layer is separate from and communicates with said universal physical discovery layer, and wherein said physical relationship type describes a relative physical proximity between said physical entities; and
providing said physical relationship type for use at a physical entity of said physical entities wherein said device includes:
a universal physical discovery layer component for providing a universal physical discovery layer;
a universal physical discovery layer interface for obtaining, at least in part, data representing a physical relationship type between physical entities in a network; and
said universal physical discovery layer component using said data to establish by said device said physical relationship type using a legacy network discovery layer interface to communicate with a legacy network discovery layer.

16. The computer-usable medium as recited in claim 15, wherein said computer-readable program code embodied therein causes said computer system to perform said method, and wherein said method further comprises implementing said legacy network discovery layer with said legacy network discovery protocol that is a service discovery protocol.

17. The computer-usable medium as recited in claim 15, wherein said computer-readable program code embodied therein causes said computer system to perform said method, and wherein said method further comprises obtaining said data representing said physical relationship type that is selected from the group consisting of contains, contained in, near, nearest, far, and farthest.

18. The computer-usable medium as recited in claim 15, wherein said computer-readable program code embodied therein causes said computer system to perform said method, and wherein said method further comprises:

said legacy network discovery layer providing values from one or more attributes to said universal physical discovery layer.

19. The computer-usable medium as recited in claim 18, wherein said computer-readable program code embodied therein causes said computer system to perform said method, and wherein said method further comprises:

associating said attributes that consist of identifiers with said physical entities, names associated with said physical entities, and services provided by said physical entities.

* * * * *

UNITED STATES PATENT AND TRADEMARK OFFICE
CERTIFICATE OF CORRECTION

| | |
|---|---|
| PATENT NO. | : 8,233,461 B1 |
| APPLICATION NO. | : 10/922631 |
| DATED | : July 31, 2012 |
| INVENTOR(S) | : Philippe Debaty |

It is certified that error appears in the above-identified patent and that said Letters Patent is hereby corrected as shown below:

In column 13, line 29, in Claim 1, delete "entities" and insert -- entities; --, therefor.

In column 14, line 53, in Claim 15, delete "entities" and insert -- entities; --, therefor.

Signed and Sealed this
Twenty-ninth Day of January, 2013

David J. Kappos
*Director of the United States Patent and Trademark Office*